(12) United States Patent
Dafesh et al.

(10) Patent No.: US 7,120,198 B1
(45) Date of Patent: *Oct. 10, 2006

(54) QUADRATURE PRODUCT SUBCARRIER MODULATION SYSTEM

(75) Inventors: Philip A. Dafesh, Los Angeles, CA (US); Tien M. Nguyen, Placentia, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,560

(22) Filed: May 26, 1999

(51) Int. Cl.
*H04L 5/12* (2006.01)
*H04L 23/02* (2006.01)

(52) U.S. Cl. .................. 375/261; 375/473; 370/487; 370/229

(58) Field of Classification Search ............... 375/130, 375/131, 135, 140, 146, 229, 235, 295, 298–300; 370/204, 203, 206, 480, 487
See application file for complete search history.

(56) References Cited

U.S. PATENT DOCUMENTS

| 3,764,731 | A | * | 10/1973 | Parker | 370/204 |
| 3,896,487 | A | * | 7/1975 | Tesler | 348/43 |
| 5,461,426 | A | * | 10/1995 | Limberg et al. | 348/473 |
| 5,469,469 | A | * | 11/1995 | Haines | 375/131 |
| 5,748,677 | A | * | 5/1998 | Kumar | 375/229 |
| 5,949,796 | A | * | 9/1999 | Kumar | 370/487 |
| 6,246,698 | B1 | * | 6/2001 | Kumar | 370/487 |
| 6,430,213 | B1 | * | 8/2002 | Dafesh | 375/146 |

* cited by examiner

*Primary Examiner*—Stephen Chin
*Assistant Examiner*—Linda Wong
(74) *Attorney, Agent, or Firm*—Derrick Michael Reid

(57) ABSTRACT

A coherent adaptive subcarrier modulation system applies subcarrier modulation to quadrature modulated signals with constant envelope modulation suitable for efficient sinewave and squarewave subcarrier modulations. The quadrature subcarrier enables the addition of new signals to the in-phase and quadrature phase signals with spectral isolation in the Global Position System while maintaining a constant envelop amplitude.

20 Claims, 3 Drawing Sheets

QUADRATURE PRODUCT SUBCARRIER MODULATION TRANSMITTER

QUADRATURE PRODUCT SUBCARRIER
MODULATION TRANSMITTER

FIG. 1

QPSM POWER SPECTRAL DENSITY

FIG. 2

CASM POWER SPECTRAL DENSITY

FIG. 3

QUADRATURE PRODUCT SUBCARRIER MODULATION SYSTEM

STATEMENT OF GOVERNMENT INTEREST

The invention was made with Government support under contract No. F04701-93-C-0094 by the Department of the Air Force. The Government has certain rights in the invention.

REFERENCE TO RELATED APPLICATION

The present application is related to applicant's copending application entitled Coherent Adaptive Subcarrier Modulation Method, Ser. No. 09/318,561, filed May 26, 1999, by one of the named inventors.

FIELD OF THE INVENTION

The invention relates to the field of modulation of signals of communication systems. More particularly, the present invention relates to subcarrier modulation methods for efficient frequency reuse within exiting bandwidths.

BACKGROUND OF THE INVENTION

Due to the limited availability of spectrum allocations for communications systems, it has become desirable to reuse existing spectrum by employing bandwidth efficient modulation methods to existing satellite communications systems. In particular, it has become desirable to add new signals to existing quadrature multiplexed spread-spectrum communication signals, such as the signals employed in the Global Positioning System (GPS), within the existing spectral allocation. As the number of users of a given communication system increases, it is often desirable to augment the system with additional communication signals. One method that has been used to achieve this goal in timing, telemetry and command links is conventional subcarrier phase modulation. Furthermore, it is often necessary to modulate new signals onto existing quadrature multiplexed communication systems within the existing spectral allocation. It is desirable that any such approach satisfy various constraints, including causing minimal distortion of existing signals, transmitting new signals through the same high power amplifier used by existing signals, accommodating new data messages and new pseudo random noise (PRN) code families for spread-spectrum systems, providing flexibility to control the spectral separation of signals within the allocated band, and providing flexibility to control the distribution of energy in and outside of the allocated band. Unfortunately, for an existing quadrature-multiplexed communication systems having data modulations on both the I and Q channels, that is, the in-phase channel with zero degree phase offset from the carrier, and the quadrature channel with ninety degree phase offset from the carrier, adding another signal slightly offset in frequency gives rise to a non-constant envelope that causes distortion to the existing signals when the total waveform is passed through a non-linear amplifier. For non-quadrature-multiplexed communication systems, the subcarrier modulation method has been employed to permit the realization of a constant-envelope modulation. Unfortunately, a general approach for applying the subcarrier modulation method to quadrature-modulated communication systems has not been previously developed.

GPS is undergoing a transformation with the Block IIF satellite. This redefinition of GPS from a military service with the guarantee of civil use to a true dual service is one of the GPS modernization goals. The transformation started out as a modest upgrade that involved a new civil L5 frequency and a military acquisition signal at the L2 frequency but has evolved into a complement of new signals at L1 and L2 frequencies for enhanced military and civil use. It is desirable to design and choose optimum M-code military signals and signal modulation methods that achieve better than current performances without degrading the existing signals. Under consideration are two classes of signals, the Manchester code signals and the binary offset carrier signals. These signals result from modulation of a non-return to zero pseudo random noise spreading code by a square-wave subcarrier. The Manchester code signal is a special case where the bit rate of the spreading code and the frequency of the square-wave are the same. It is also equivalent to a Manchester encoded PRN code. The binary offset carrier signal has been defined as encompassing all the other cases where the rate of the spreading code is less than the subcarrier frequency. These signals share the characteristic of conventional subcarrier modulation that the waveform exhibits a null at the carrier frequency due to the square-wave subcarrier, and therefore, can allow for the transmission of the new GPS military M-codes along with the course acquisition C/A-codes, and precision P(Y) codes, where (Y) denotes the encrypted form of the P-code. One of the key challenges for a new signal scheme for the GPS transmitter is to transmit the C/A, P(Y), and M-code signals using a flexible efficient, constant envelope modulation method, compatible with goals of the GPS modernization.

To this end, it is desirable to develop a general high-efficiency constant-envelope subcarrier modulation approach to enable quadrature multiplexing of an M-code signal or signals onto the L1 and L2 GPS carriers that is applicable to both a combined-aperture for transmitting C/A, P(Y), and M-code signals through the same upconverter and amplifier chain and antenna, and a separate-aperture for transmitting M-code signals out of a separate upconverter, amplifier chain and antenna from C/A and P(Y) signals without resulting in significant signal loss due to inefficient signal modulation methods. The current Block II and Block IIR satellites employ constant-envelope quadrature multiplexing of two bi-phase modulated ranging code signals at the GPS L1 frequency, namely the C/A code and P(Y) code. The baseline Block IIF satellite will also transmit these signals on both the GPS L1 and L2 frequencies, along with the new military signals.

The new M-code signal consists of the product of a military data modulation multiplied by a spreading code modulation. Previously proposed approaches for augmenting the existing GPS waveform, with a new split-spectrum M-code signal, such as the tri-code hexaphase modulation method, involve the linear addition of a single new M-code signal on to the existing GPS waveform. These approaches multiplex the additional signal with an existing I/Q quadrature modulation by adding a third signal to one of the I and Q phases. Unfortunately, this gives rise to the undesirable non-constant envelope, that is, a variable amplitude. For this case, the envelope of the composite signal is no longer constant due to the presence of the time-varying amplitude component in addition to the constant component of the envelope. This result is undesirable because the amplitude variations will give rise to AM-to-AM and AM-to-PM distortions when the signal is passed through a nonlinear amplifier unless the operating point of the amplifier is backed off from its saturation point to the linear region of amplifier operation. Such a back off can result in appreciable power losses.

During the course of the GPS military signal development study, a number of M-code signal modulation methods have been proposed. Two of the leading approaches were hard-limiting the sum of the C/A, P and M-code signals, and majority voting. The hard-limiting approach involves forcing the non-constant envelope waveform resulting from the sum of C/A and M on one carrier phase and P on the other, to be constant by limiting the amplitude variation to a minimum value. This technique results in significant signal power loss and distortion for the case of equal C/A and M-code power levels as is the case for hard-limited tri-code hexaphase modulation method. Furthermore, the exact efficiency is critically related to the power balance between C/A, P(Y) and M-code signals and the desired balance between signals is not easy to achieve. An alternative approach to combining M-code with C/A and P(Y) code signals is through majority vote combining. In the majority vote approach, signals are time multiplexed, that is, time-shared, on either I or Q phases to allow multiple signals to be transmitted in a single constant envelope. The disadvantage of this approach results from the relatively large majority combining loss per code in combination, assuming equal power levels for all codes in the majority combination. Furthermore, it is difficult to control the relative power levels of the combined signals without incurring additional combining losses.

Conventional subcarrier modulation has been recognized as a means to modulate additional signals onto a modulated carrier signal while maintaining a constant envelope. The Space-Ground-Link Subsystem for example, employs three subcarriers that are phase-modulated onto a carrier signal to enable the modulation of four signals, including one carrier modulation and three subcarrier modulations. The classical subcarrier approach, applied to non-quadrature-multiplexed communication systems, involves the phase-modulation of a carrier signal by one or more periodic subcarriers that are typically sine-wave, square-wave or triangle-wave signals. In this classical subcarrier approach, the range of the phase modulation is determined by a so-called modulation index, usually controlled by the gain of the phase modulator. In conventional subcarrier systems, cross-product intermodulation components of the waveform are interpreted as signal losses. A variation of conventional subcarrier modulation applicable to augmenting the existing GPS signals with new M-code signals is desirable due to the inefficiency of the previously proposed M-code signal combining techniques, that is, signal modulation methods.

An alternative combining method has been proposed to add the new M-code signals by spatially combining the new M-code signal with the C/A and P(Y) code signals by transmitting the new M-code signals through a separate antenna and amplifier chain. While this approach would, in principal, allow for the transmission of C/A-codes and P(Y)-codes within the M-code, the simplification in modulator design is more than offset by the impact on the satellite when adding an independent antenna and amplifier chain. Due to potential implementation difficulties with the separate-aperture approach, and a requirement to efficiently transmit the new M-code signals with world-wide coverage, the more challenging problem of transmitting these signals is the development of a general modulation approach to enable the transmission of these signals through a single modulator, upconverter, power amplifier chain and antenna aperture.

The leading modulation methods, that have been proposed thus far to achieve this end, have a maximum efficiency limited to roughly seventy-one percent in the allocated GPS spectral band. Efficiency is defined as the sum of the effective transmitter power after reception plus any band limiting losses and other losses associated with this sum divided by the total transmitted power. At the same time, the leading approaches with the highest efficiency restrict options available to optimize the waveform by transmitting a single M-code signal used for both acquisition and tracking.

These single M-code approaches include tri-code hexaphase, hard-limited tri-code hexaphase, majority vote code multiplexing, and offset carrier and binary offset carrier modulations. The tri-code hexaphase, offset carrier and binary offset carrier modulation approaches have a non-constant envelope. As a result, these approaches cause distortion to existing signals when the total waveform is passed through a non-linear amplifier. The majority vote modulation approach employs a constant envelope but does not provide significant spectral separation and has limited inherent flexibility in adjusting the amplitude of generated harmonics. The majority vote modulation approach also suffers from majority combining losses that results in relatively poor overall power efficiency. The same is true for the hard-limited tri-code hexaphase modulation method.

The transmission of both data and spreading code modulations in a quadrature-multiplexed communication channel is well known. Conventional quadrature phase shift keying (QPSK) direct-sequence spread spectrum modulation schemes generally employ spreading sequences on the in-phase and quadrature channels. The modulation of unspread data is a special case. For GPS L1 or L2 carriers modulated by codes and data, a carrier signal is modulated by codes and data in a conventional quadrature modulated communication signal as $S_0(t)$ in terms of the in-phase $I_0(t)$ and quadrature $Q_0(t)$ signals. The signal $S_0(t)$ can express GPS L1 and L2 carriers modulated by C/A and P codes and data in a conventional quadrature modulation communication method in terms of an $S_0(t)Q_0/I_0$ equation with respect to an $I_0$ equation and a $Q_0$ equation.

$$S_0(t) = I_0(t)\cos(\omega_c t) - Q_0(t)\sin(\omega_c t)$$

$$I_0(t) = \sqrt{\frac{2P_I}{P_T}} D_I(t) C_I(t)$$

$$Q_0(t) = \sqrt{\frac{2P_Q}{P_T}} D_Q(t) C_Q(t)$$

The $C_I(t)$ and $D_I(t)$ terms are the in-phase pseudo random noise spreading code and data modulation, and $C_Q(t)$ and $D_Q(t)$ are the quadrature pseudo random noise spreading code and data modulations. $P_I$ and $P_Q$ are the average power of the I and Q signals in relation to total power $P_T$.

The signal $S_0(t)$ may also be expressed in an $S_0(t)A_0/\phi$ equation. An $A_0(t)$ magnitude equation describes the envelope form where $A_0(t)$ is the magnitude envelope of $S_0(t)$. A $\phi(t)$ equation describes the phase of $S_0(t)$.

$$S_0(t) = A_0(t)\cos(\omega_c t + \phi(t))$$

$$A_0(t) = \sqrt{I_0^2(t) + Q_0^2(t)} = \sqrt{\frac{2(P_I + P_Q)}{P_T}} = \text{CONSTANT}$$

$$\phi(t) = \text{Tan}^{-1}\frac{Q_0(t)}{I_0(t)} = \text{Tan}^{-1}\sqrt{\frac{P_Q}{P_I}} \cdot \frac{D_Q(t)C_Q(t)}{D_I(t)C_I(t)}$$

The total average power may be described by a $P_{TF}$ equation for the signal $S_0(t)$ that can be expressed by the magnitude of the envelope squared divided by two, in reference to identity equations based on the square of the $C_I$ and $C_Q$ code signals and the $D_I$ and $D_Q$ data signals.

$$P_{TF} = \frac{A_0^2}{2} = \frac{I_0^2 + Q_0^2}{2} = \frac{P_I + P_Q}{P_T}$$

$$C_I(t)^2 = C_Q(t)^2 = D_I(t)^2 = D_Q(t)^2 = 1$$

Conventional approaches to multiplexing additional signals with an existing I/Q quadrature modulation involve adding a third signal to one of the two I or Q phases. Unfortunately, this gives rise to the undesirable non-constant envelope characteristic. A signal can be linearly added to the I phase of the baseband waveform modulated onto the same carrier as the existing I/Q signals. For this case, the magnitude envelope of the signal $A_0(t)$ is no longer constant due to presence of the time-varying component of $A(t)$ in addition to the constant component of $A_0(t)$. This result is undesirable because the amplitude variations will give rise to amplitude modulation to amplitude modulation (AM-to-AM), and amplitude modulation to phase modulation (AM-to-PH) distortions when the signal is passed through a nonlinear amplifier. These and other disadvantages are solved or reduced using the invention.

SUMMARY OF THE INVENTION

An object of the invention is to provide a constant envelope composite signal with added subcarrier signals that do not distort existing signals when the composite signal is passed through a high-power amplifier operating near saturation.

Another object of the invention to provide for the modulation of new signals onto a quadrature multiplexed communication channel while controlling the power balance between signals while maintaining a constant envelope.

Yet another object of the invention is control the spectral separation of quadrature multiplexed signals within the allocated band through the use of subcarrier frequencies, subcarrier codes rate, and a subcarrier modulation index.

Yet another object of the invention is to enable the modulation of an orthogonal pair of subcarrier signals on to the I and Q phases of a quadrature modulated carrier.

Another object of the invention is to transmit the new M-code signals using either separate or combined-apertures with reduced distortion and losses.

A further object of the invention is to provide control of the distribution of energy among signals inside and outside an allocated band.

Yet a further object of the invention is to utilize cross-product intermodulation signals as useful communication signals.

In a general aspect of the invention, quadrature product subcarrier modulation (QPSM) enables the transmission of a quadrature multiplexed carrier modulation with one or more subcarrier signals in the same constant-envelope waveform. The generalized QPSM enables the application of subcarrier modulation to quadrature multiplexed communication systems such as quadrature phase shift keying (QPSK) or minimum shift keying (MSK). The QPSM can be applied to both direct and spread-spectrum quadrature multiplexed communication systems. In particular, QPSM is advantageous for any spread spectrum system desiring additional spread signals with spectral isolation between new and existing pseudo random noise (PRN) code signals using the same transmitter power amplifier. QPSM can augment existing two-code spread-spectrum systems, without the need to employ time multiplexing or majority voting that result in significant power losses, while maintaining a constant envelope signal with spectral separation between existing signals and new signals with high efficiency. The QPSM enables a quadrature-multiplexed subcarrier spread-spectrum waveform modulation using, in general, multiple rate product codes that cause minimal interference to existing codes and the new codes. The modulation index can be used to control the distribution of energy between carrier and subcarrier signals.

In a particular aspect of the invention, coherent adaptive subcarrier modulation (CASM) is provided as a flexible, efficient GPS modulation approach that can be tailored to different civilian and military GPS modes of operation to provide high efficiency without altering the basic modulation architecture. This efficiency can be tailored using a suitable modulation index, spreading code and subcarrier rates. CASM offers a constant envelope subcarrier modulation method particularly suitable the GPS. CASM provides a high efficiency of greater than 90% with inherent flexibility to fine tune the modulation architecture and maintain an ability to provide backward compatibility with current GPS signals within the allocated 24.0 MHz GPS band. CASM can generate new GPS acquisition and tracking codes from products of the current GPS ranging signals and a newly defined subcarrier code and code partition function. CASM can generate a military GPS acquisition and a military GPS tracking signal from a single new code.

CASM is applicable to the transmission of quadrature duplexed military acquisition (MA) and military tracking (MT) signals in a flexible and efficient manner. The high efficiency approach is applied to both combined-aperture, with C/A, P(Y), MA and MT passed through the same upconverter amplifier chain and antenna and separate-aperture, with MA and MT signals transmitted out of a separate upconverter, amplifier chain and antenna from C/A and P(Y)) communication path. The CASM waveform is a highly efficient means of quadrature multiplexing new GPS military acquisition and tracking signals with flexibility in adjusting the relative power of combined signals without greatly altering the power efficiency of the GPS waveform. The combined-aperture CASM offer power-efficient constant-envelope GPS modernization waveforms including the combination of C/A, P and M-code signals. The generated M-code signals are mathematically equivalent to the spatially combined signals.

CASM employs a subcarrier to phase modulated new M-code signals on the same carrier as the current C/A and P(Y) ranging codes. The constant-envelope CASM modulation is an evolution of the constant-envelope subcarrier modulation used on SGLS and other terrestrial and space systems to quadrature-multiplexed systems. Unlike prior subcarrier modulation developments, the CASM utilizes cross-product intermodulation terms as new ranging communication signals. In the present invention, using subcarrier modulation, cross product terms are interpreted as signals and not as losses. Preferably, the M-Code signals are generated by employing square-wave subcarriers to modulate the new military ranging signals, due to ease of hardware implementation, but CASM may be generated using both squarewave and sinewave subcarriers for GPS modernization. These and other advantages will become more apparent from the following detailed description of the preferred embodiment.

DETAILED DESCRIPTION OF THE PREFERRED EMBODIMENT

Figure 1:
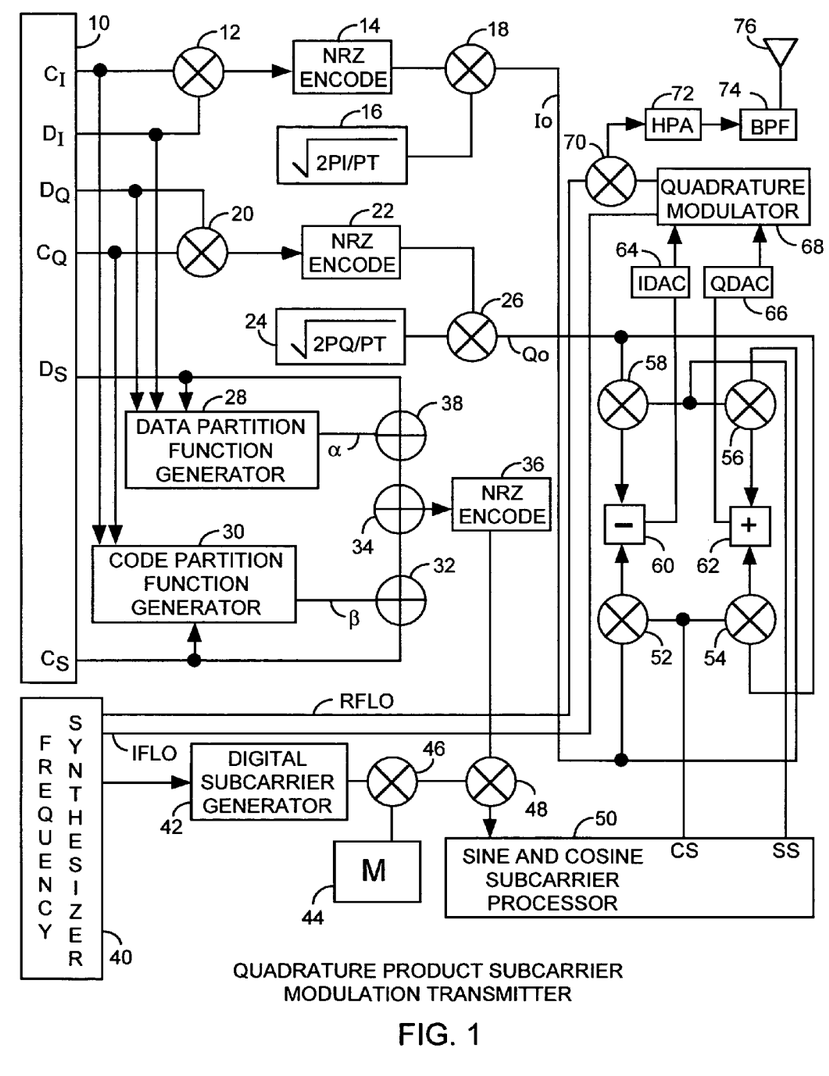
FIG. 1 is a block diagram of a digital baseband phase modulator subcarrier modulation implementation of quadrature product subcarrier transmitter that can be used for generating general quadrature product subcarrier modulation (QPSM) signals as well as particular coherent adaptive subcarrier modulation (CASM) signals.

A detailed description of the preferred embodiment is described with reference to the figures using reference designations as shown in the figures. Referring to FIG. 1, a quadrature product subcarrier modulation (QPSM) transmitter is used for transmitting in-phase code $C_I$, inphase data $D_I$, quadrature code $C_Q$, quadrature data $D_Q$, subcarrier code $C_S$ and subcarrier data $D_S$ signals originating from a code and data generator 10. The in-phase code and data signals are mixed by mixer 12, NRZ formatted by formatter 14, and power scaled by power factor 16 using mixer 18 providing the in-phase signal $I_0$. The quadrature code and data signals are mixed by mixer 20, NRZ formatted by formatter 22, and power scaled by power factor 24 using mixer 26 providing a quadrature signal $Q_0$. The mixers 12, 18, 20, 26, power factors 16 and 24, and formatters 14 and 22 may be integrated as a Q/I phase processor module.

In-phase and quadrature data signals $D_I$ and $D_Q$ are received by a data partition function generator 28 providing a data partition signal α. In-phase and quadrature code signals $C_I$ and $C_Q$ are received by a code partition function generator 30 providing a code partition signal β. The code partition signal β is mixed by modulo two mixer 32 with the subcarrier code signal $C_S$ providing a mixed code signal communicated to another modulo two mixer 34 connected to another NRZ formatter 36. The data partition signal α is also mixed by modulo two mixer 38 with the subcarrier data signal $D_S$ providing a mixed data signal communicated to the modulo two mixer 34 providing a composite digital modulated signal to the formatter 36 that provides an encoded subcarrier modulation signal to the mixer 48.

A frequency synthesizer 40 is used to generate necessary clock signals for the generator 10. The synthesizer 40 also generates a subcarrier clock signal communicated to a digital subcarrier generator 42 for providing a digital subcarrier signal that is scaled by a scaler 46 using a modulation index m 44 to provide a scaled digital subcarrier signal communicated to a mixer 48 that mixes the scaled digital subcarrier signal with the encoded subcarrier modulation signal from the formatter 36 to providing a modulated subcarrier signal communicated to a sine cosine processor 50 providing a sine subcarrier signal SS and a cosine subcarrier signal CS. The generators 28, 30, 42, formatter 36, processor 50, scaler 46, and mixers 32, 34, 38, and 48 may be integrated as a subcarrier digital baseband processor module.

The cosine subcarrier signal CS is communicated to mixers 52 and 54 respectively receiving the $I_0$ signal and $Q_0$ signal and respectively providing a cosine $I_0$ product signal and a cosine $Q_0$ product signal. The sine subcarrier signal SS is communicated to mixer 56 and 58 respectively receiving the $I_0$ signal and $Q_0$ signal and respectively providing a sine $I_0$ product signal and a sine $Q_0$ product signal. The cosine $I_0$ product signal from mixer 52 and the sine $Q_0$ product signal from mixer 58 are subtracted by subtractor 60 providing a digital rotated I signal. The cosine $Q_0$ product signal and the sine $I_0$ signal are added by an adder 62 providing a digital rotated Q signal. The digital rotated I signal from the substracter 60 is communicated to an in-phase digital-to-analog converter (IDAC) 64 providing an analog rotated I signal. The digital rotated Q signal from the adder 62 is communicated to a quadrature digital-to-analog converter (QDAC) 66 providing an analog rotated Q signal.

The analog rotated I signal from IDAC 64 and the analog rotated Q signal from the QDAC 66 are received by a conventional quadrature modulator 68 providing an intermediate frequency (IF) modulated signal by quadrature modulation using an IF local oscillator signal IFLO from the frequency synthesizer 40. The IF modulated signal from quadrature modulator 68 is modulated by a radio frequency (RF) local oscillator signal (RFLO) using a mixer 70 that provides an RF modulated signal communicated to a high power amplifier 72 that, in turn, provides an amplified RF modulated signal to a band pass filter 74 that, in turn, provides a filtered RF modulated signal to a transmitting antenna 76 for broadcast communication of a composite signal S(t). The RF modulated signal from mixer 70 is expressed by the $S_0(t)Q/I$ equation, $S_0(t)$ and $P_{TF}$ equations when the modulation index m is equal to zero. The gain of the high power amplifier is expressed as the square root of the total power $P_T$. The communication channel including the modulator 68, mixer 70, high power amplifier 72, channel band pass filter 74 and antenna 76 are conventional means well known in the art.

The new QPSM transmitter includes the addition of the subcarrier frequency generator 42 in the subcarrier digital baseband processor module and the scaler 44 to phase modulate the digital subcarrier. The mathematical equivalent of a phase rotation is constructed in the baseband by operating on the unrotated $I_0$ and $Q_0$ signals. This is achieved by transforming $I_0$ and $Q_0$ to I(t) and Q(t). This complex-baseband approach can be implemented digitally in an application specific integrated circuit as a flexible means of subcarrier generation using the subcarrier processor 50.

The preferred transmitter shown in FIG. 1 can be implemented in whole or in part using equivalent analog means. For example, the phase modulation may also be performed on the subcarrier directly subject to the frequency limitations of an equivalent analog phase modulator. In this equivalent analog implementation, the encoded subcarrier modulation signal is directly phase modulated onto the RF carrier RFLO by applying the encoded subcarrier modulation signal to the input of an analog phase modulator, not shown, having a modulation index n that phase modulates the RFLO signal. In this equivalent analog phase modulator case, the sine and cosine subcarrier processor module and mixers 52, 54, 56, 58, as well as subtractor 60 and adder 62 are bypassed and the $I_0$ signal and $Q_0$ signals are inputs directly into the quadrature modulator 68 connected directly to the high power amplifier 72.

In a single subcarrier QPSM, the phase $\phi(t)$, is augmented by the subcarrier signal, $\theta(t)$ modulated subcarrier signal from the mixer 48.

$$\theta(t)=m\phi_S(t)=mD_S(t)\alpha_D(t)C_S(t)\beta_C(t)\phi_S(t)$$

The term $\phi_S(t)$ is a periodic subcarrier signal that may be an arbitrary periodic waveform such as sine-wave, square-wave, triangle-wave, having an angular frequency $\omega_S=2\pi f_S$, in rad/sec. The term m is the modulation index in radians. $D_S(t)$ is the subcarrier data. $C_S(t)$ is a non-return-to-zero (NRZ)-encoded PRN code with chipping rate Rcs. The term $\phi_S(t)$ represents the composite subcarrier signal for the case of a single subcarrier. $\alpha_D(t)$ and $\beta_C(t)$ are a function of the type of QPSM modulation employed. These functions are typically binary functions and are used to preform the appropriate binary signals so that the desired resultant subcarrier code and data modulations will result in the composite spectrum. Using these definitions for forming $I_0(t)$ and $Q_0(t)$, the QPSM waveform is defined as S(t). S(t) represents the phase modulation of $S_0(t)$ by $\theta(t)$, and can be expressed by I(t) in-phase and Q(t) quadrature components out of the RF mixer 70.

$$s(t)=I_0(t)\cos(\omega_c t+m\phi_S(t))-Q_0(t)\sin(\omega_c t+m\phi_S(t))$$

The S(t) subcarrier modulated S(t) RF signal from mixer 70 can be written in an expanded form.

$$s(t) = \left\{ \begin{array}{l} I_0(t)\cos(m\phi_S(t)) \\ -Q_0(t)\sin(m\phi_S(t)) \end{array} \right\} \cos(\omega_c t) - $$
$$\left\{ \begin{array}{l} Q_0(t)\cos(m)\phi_S(t)) \\ +I_0(t)\sin(m)\phi_S(t)) \end{array} \right\} \sin(\omega_c t)$$
$$= I(t)\cos(\omega_c t) - Q(t)\sin(\omega_c t).$$

The analog I(t) and Q(t) signal, respectively from IDAC 64 and QDAC 66 are subcarrier rotated signals expressed as subcarrier rotated carrier modulations, $I_0(t)$ and $Q_0(t)$, as a function of subcarrier phase $\phi(t)$.

$$I(t)=I_0(t)\cos(m\phi_S(t))-Q_0(t)\sin(m\phi_S(t))$$

$$Q(t)=Q_0(t)\cos(m\phi_S(t))+I_0(t)\sin(m\phi_S(t))$$

The envelope A(t) of the subcarrier augmented waveform is constant as the square root of the two times the sum of in-phase power $P_I$ plus the quadrature power $P_Q$. Because the subcarrier modulation $\theta(t)=m\phi_S(t)$ is a phase modulation equivalent to rotation of both $I_0$ and $Q_0$ components of $S_0(t)$, the constant envelope is maintained independent of the choice of $\theta(t)$. Hence, the total average power envelope of the subcarrier augmented waveform remains constant and is the sum of the in-phase power $P_I$ and the quadrature power, $P_Q$.

A single sinewave subcarrier can be an efficient means to modulate three signals in a constant-envelope waveform. For this case, $\phi_S=\sin(\omega_S t)$, so that $m\phi_S$ is a function of $\sin(\omega_S t)$.

$$m\phi_S=mD_S(t)\alpha_D(t)C_S(t)\beta_C(t)\sin(\omega_S t).$$

The $\cos(m\phi_S(t))$ and $\sin(m_S\phi(t))$ terms may be expanded in terms of Bessel functions. The sinewave S(t) equation is a good approximate to terms of order $J_2$.

$$s(t) \cong$$
$$\left\{ \begin{array}{l} \sqrt{2P_I} \cdot J_0(m)D_I(t)C_I - \\ \sqrt{2P_Q} \cdot 2J_1(m)D_Q(t)C_Q(t)\alpha_d(t)d_S(t)\beta_C(t)C_S(t)\sin(\omega_S t) \end{array} \right\} \cos(\omega_c t) -$$
$$\left\{ \begin{array}{l} \sqrt{2P_Q} \cdot J_0(m)D_Q(t)C_Q(t) + \\ \sqrt{2P_I} \cdot 2J_1(m)D_I(t)C_I(t)\alpha_d(t)d_S(t)\beta_C(t)C_S(t)\sin(\omega_S t) \end{array} \right\} \sin(\omega_c t) +$$
$$\sqrt{2P_I} \cdot 2J_2(m)D_I(t)C_I(t)\cos(2\omega_S t)\cos(\omega_c t) -$$
$$\sqrt{2P_Q} \cdot 2J_2(m)D_Q(t)C_Q(t)\cos(2\omega_S t)\sin(\omega_c t).$$

In the sinewave subcarrier QPSM approach, it is convenient to assume that the modulation index of the subcarrier waveform, m is less than $\pi/2$ rads. For this case, the power contained in the $J_2$ terms is much less than the power contained in $J_1$ and $J_0$ terms, for example, for M=1 rad the power of $J_2$ term is less than 10 db below the $J_1$ and $J_0$ terms. Furthermore, because these terms are spectrally separated from the carrier and subcarrier terms, the $J_1$ and $J_0$ terms will have a negligible contribution to the baseband correlations with $C_I(t)$ and $C_Q(t)$. Thus, neglecting the $J_2$ terms and applying the identities equations yields good approximation of the power content of S(t) for a sinewave subcarrier QPSM.

The term $\alpha_D(t)$ is defined as the data partition function with $[\alpha_D(t)]^2=1$. The term $\beta_C(t)$ is defined as the code partition function with $[\beta_C(t)]^2=1$. Both $\alpha_D$ and $\beta_C$ are defined in terms of QPSM variations. Both data and code QPSM messages have several variations. For $\alpha_D(t)=D(t)=D_I(t)=D_Q(t)$, the modulation is defined as doubly balanced QPSM because D(t) is balanced on both carrier channels and $D_I(t)=D_Q(t)=D_S(t)$ is balanced on both subcarrier channels. In this case, the data modulation may be obtained by first tracking the carrier or the subcarrier signals. For $\alpha_D(t)=D_S(t)$, and $D_I(t)=D_Q(t)=D(t)$, the modulation is defined as singly balanced QPSM because D(t) is balanced on both carrier channels and the data modulation on the subcarrier signals is identical to that on the carrier signals. In this case, the data modulation may be obtained by first tracking the carrier or the subcarrier signals. For $\alpha_D(t)=D_S(t)$ and $D_I(t) \approx D_Q(t)$, the modulation is defined as, singly unbalanced QPSM because D(t) is balanced on both carrier channels and the data modulation on the subcarrier signals is identical to that on the carrier signals. In this case, the data modulation may also be obtained by first tracking the carrier or the subcarrier signals. For $\alpha_D(t)=1$, with $D_I(t)$, $D_Q(t)$, specified as different data messages, the modulation is defined as unbalanced QPSM because the data modulations on the in-phase and quadrature channels are different. For this case, the $D_I(t)$, $D_Q(t)$ messages must be demodulated prior to the demodulation of the $D_S(t)$ subcarrier message. For $\beta_C(t)=1$, the resulting code is defined as normal QPSM. In this case, the carrier and subcarrier codes are selected so that the product is a higher order code. For example, the subcarrier code may be selected as a member of a preferred pair of M-sequences so that the resultant carrier-subcarrier product code is a gold code. For $\beta_C(t)=C_I(t)C_Q(t)$, the resulting code is defined as quadrature reversed QPSM. For $\beta_C(t)=C_S(t)$, the resulting code is defined as dual code QPSM. In general $\beta_C(t)$ may take on any combination of codes or functional forms to tailor the code shape and energy distribution of the QPSM waveform. Combinations of code and data variations are designated by first data designation followed by code designation followed by QPSM. For example, a combination of $\alpha_D(t)=D_S(t)$ and $D_I(t)\approx D_Q(t)$ and $\beta_C(t)=C_I(t)C_Q(t)$ would be known as singly unbalanced, quadrature reversed QPSM.

The QPSM waveform may also be developed for the squarewave subcarrier by setting $\phi_S(t)=\text{Sqr}(\omega_S t)$ For this case, $\cos(m\phi_S t)=\cos(m)$ and $\sin(m\phi_S t)=\sin(m)\phi_S(t)$. After applying these definitions, the QPSM S(t) waveform for the square-wave subcarrier may then be expressed.

$$s(t)=\sqrt{2P_I}\cdot\cos(m)D_I(t)C_I(t)\cos(\omega_c t)$$
$$-\sqrt{2P_Q}\cdot\cos(m)D_Q(t)C_Q(t)\sin(\omega_c t)$$
$$-\sqrt{2P_Q}\cdot\sin(m)D_{QS}(t)C_{QS}(t)\text{Sqr}(\omega_S t)\cos(\omega_c t)$$
$$-\sqrt{2P_I}\cdot\sin(m)D_{IS}(t)C_{IS}(t)\text{Sqr}(\omega_S t)\sin(\omega_c t)$$

By appropriate choice of the modulation index m for sinewave QPSM, most of the usable power in the subcarrier waveform is transmitted to the signals, $C_I$, $C_Q$, $C_{IS}$ and $C_{QS}$. The total power of S(t) is expressed in terms of the total power of each component $P_I$ and $P_Q$ for each $J_0$, $J_1$, and $J_2$ harmonics. The wasted power in the higher order harmonics of S(t) is unused and constitutes a signal loss. The power efficiency of the subcarrier waveform is then given by dividing the received power of the J0 carrier and J1 subcarrier harmonics by the total power of $P_T=P_I+P_Q$, and expressed by a sinewave power efficiency equation.

$$\eta_P(m) = \frac{P_I*J_0^2(m) + P_Q*J_0^2(m) + P_I*2J_1^2(m) + P_Q*2J_1^2(m)}{P_I+P_Q} = J_0^2(m) + 2J_1^2(m)$$

The powers delivered to the carrier $P_C=P_T J0^2(m)$ component and subcarrier first harmonic $P_S=P_T 2J1^2(m)$ component can be compared. To select roughly equal power distribution between all four I and Q carriers, and I and Q subcarrier components, a modulation index of m=1.16 with $P_I=P_Q$ is selected. In this case, the efficiency of the sinewave subcarrier modulation approaches 95%. The power efficiency of the QPSM waveform treats the second and higher order subcarrier components as harmonic losses. For most applications, these components are outside the band of interest and/or carry too little energy to be detected. The QPSM waveform is over 95% power efficient, that is, only a 0.2 dB power loss, for modulation indices less than 1.16 for $P_C$ less than or equal to $P_{SC}$. For values of m less than 1.2, the efficiency is over 95%. This efficiency, combined with QPSM constant-envelope makes the QPSM an effective modulation approach to augment existing quadrature-multiplexed communication systems or multiplex, spectrally separated communication channels about the same carrier.

For the case of a squarewave subcarrier, the total power of S(t) may be expressed as a function of the $P_I$ and $P_Q$ components. When both $I_S$ and $Q_S$ subcarrier signals are tracked in the QPSM, the efficiency of the QPSM waveform is 100% for all m, assuming negligible band-limiting losses. This is illustrated by the following squarewave power efficiency equation.

$$\eta_P(m) = \frac{P_I \cdot \cos^2(m) + P_Q \cdot \cos^2(m) + P_I \cdot \sin^2(m) + P_Q \cdot \sin^2(m)}{P_I+P_Q} = 1$$

In reality, however, only signals modulated to the first harmonic of the squarewave subcarrier are contained in the band of interest, with the bandwidth of the subcarrier signals being several times less than the subcarrier frequency. Band limiting effects can be approximated by employing the Fourier expansion of the squarewave signal to order n=2k−1, to obtain the approximate result for a band-limited channel. The power in the subcarrier is proportional to the RMS value of $\text{Sqr}(\omega_S t)$. A typical approximate made be realized for squarewave subcarriers with neglected overlap between respective code and data signals at squarewave harmonics in band-limited channels for a squarewave subcarrier modulated QPSM. The power efficiency of the square-wave subcarrier QPSM with the modulation index corresponding to equal carrier and subcarrier power is m=0.84 and yields a power efficiency of 89% expressed by an approximate squarewave power efficiency equation.

$$\eta_P(m) \cong \cos^2(m) + \left(\frac{8}{\pi^2}\right)\sin^2(m)$$

Under realistic constraints of a band-limited channel, the squarewave subcarrier is generally less power efficient than the sinewave subcarrier.

Figure 2:
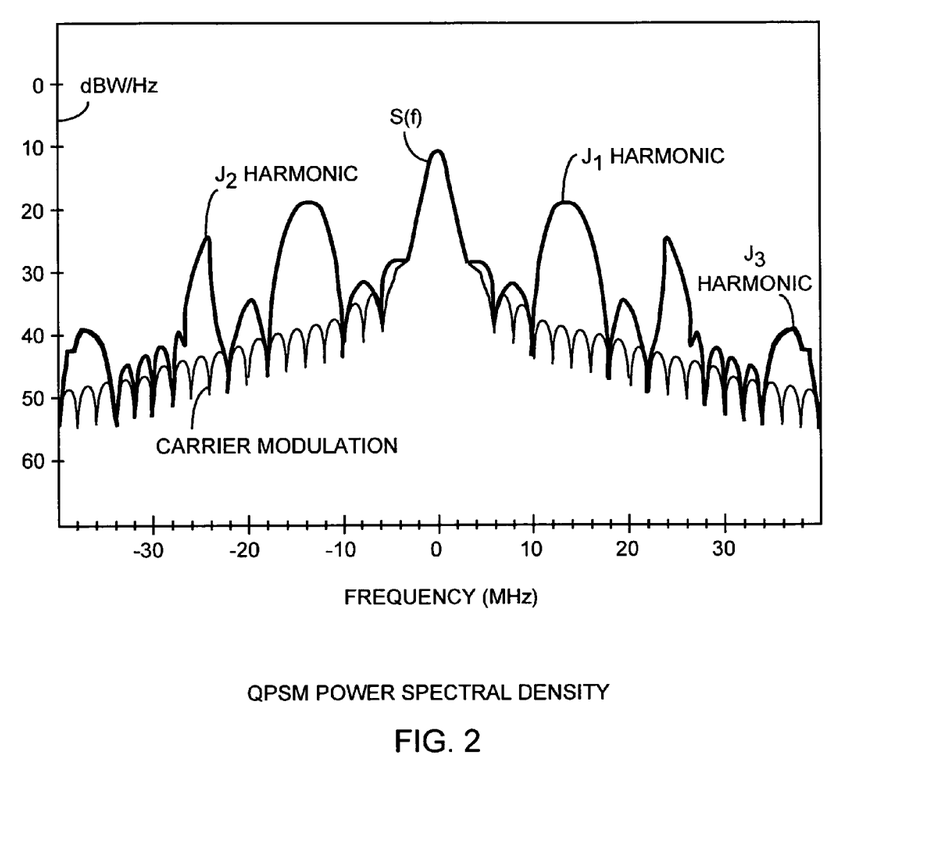
FIG. 2 is a QPSM spectral plot.

Referring to FIG. 2, a representative example of the QPSM modulation is shown by the power spectral density (PSD) of a singly-balanced QPSM presented for the case of a quadrature-multiplexed direct sequence spread-spectrum system with $C_I$ selected as a 2.0 MHz PRN code, $C_Q$ selected as a 1.0 MHz PRN code and $C_S$ selected as a 4.0 MHz PRN code. In this example, the data modulation rates are selected at 10.0 KBPS so that the dominant spectral features would be the subcarrier modulated $I_0$ and $Q_0$ PRN codes. The subcarrier was selected as a 12.0 MHz sinewave.

The generalized quadrature product subcarrier modulation applies subcarrier modulation to quadrature-multiplexed communication systems without the need to employ non-constant envelope modulation subject to amplitude modulation to amplitude modulation, and amplitude modulation to phase modulation distortions through a nonlinear high power amplifier. The spectral components reveal improved power distribution and power efficiency for both the square-wave and sinewave subcarriers. The power efficiency is approximately over 95% efficient for sinewave subcarriers and over 90% efficient for square-wave subcarriers for the case of equal carrier and subcarrier powers in band-limited channels.

The resultant waveforms are for a single subcarrier, however, QPSM can be applied to multiple subcarrier signals. Employing multiple rates in the general case, product codes can produce the desired spectral components in the resultant waveform and these signals are generalized by defining the multiple subcarrier phase modulation. In a generalized QPSM, a composite baseband signal of n-subcarriers is formed by replacing $m\phi_S$ in the original approach with the composite signal. The subcarrier can be a single sinewave with $\theta(t)=\sin(\omega_S t)$ or a squarewave with $\theta(t)=\text{Sqr}(\omega t)$, or other periodic functions. $\theta(t)$ is substituted into the subcarrier modulation equation $m\phi_S$, to generate a generalized subcarrier equation.

$$\Theta(t) = \sum m^K D_S^K(t) \alpha_S^K(t) C_S^K(t) \beta_S^K(t) \Phi^K(t)$$

The term $m^K$ is the modulation index of the K-th subcarrier. In the generalized form of the invention, $\theta_K(t)$ is the K-th subcarrier and may be any periodic function having radian frequency, $\omega_S^K = 2\pi_S^K$. $D_S^K$ is K-th data sequence of the K-th subcarrier. $\alpha_D^K(t)$ is the data partition function of the K-th subcarrier and $\beta_C^K(t)$ is the code partition function of the K-th subcarrier. These partition functions, generally need not be binary.

QPSM employs the code and data partition functions to form desired subcarrier harmonics that are used to transmit information. Hence, cross-product terms are used as new communication signals. That is, the QPSM pre-multiplies the spread-data waveform by another spread data waveform so that the resultant product, naturally arising from the subcarrier modulation, is usable as a new communication signal. By doing so, the majority of the signals in the waveforms are designed for use as usable signals rather than allocated to wasted energy of intermodulation products. By pre-multiplying by code and data partition functions, QPSM allows for the implementation of subcarrier modulation on quadrature multiplexed communication signals. QPSM applies generally to any quadrature waveform including spread-spectrum waveforms. For the general case, neither the data nor the code partition functions must be binary. The functions need only to be selected such that the cross-product terms in the resultant subcarrier modulation are designed to be the signal of interest.

A specific example of the general QPSM to quadrature spread spectrum communication waveforms is coherent adaptive subcarrier modulation (CASM). CASM allows for the presence of two time-varying quadrature multiplexed carrier signals in addition to the subcarrier signals that modulate the phase of the carrier, that are modulated producing a constant envelope composite signal using a single modulation index. The ability to employ subcarrier phase modulation to a quadrature-modulated signal is facilitated by the unique formulation of the CASM. CASM can be applied to GPS waveforms utilizing quadrature multiplexing and subcarrier modulation to transmit at least three GPS ranging signals in the same constant-envelope waveform. The specific formulation of the CASM is generalized to multiple civilian and military GPS signals that may be on any combination of the $I_0(t)$ carrier, $Q_0(t)$ carrier and subcarrier signals. The formatting of these signals is not a limitation of CASM and the partition functions $\alpha_D^K(t)$ and $\beta_C^K(t)$ defined for the i-th subcarrier, and may be composed from any combination of NRZ spreading codes, other periodic function at any frequency, and the current GPS data modulation commonly known as the GPS navigation message, and/or spreading codes including the GPS C/A code, and P/Y code. The specific CASM is selected to optimize the signals of interest and to suppress interference between signals in the composite waveform. Hence, the QPSM is not limited to sinewave subcarriers but may be generalized to an arbitrary number of square-wave, or other periodic, subcarrier signals. The CASM describes a specific methodology for use of multiple code and data partition functions to form an inherently constant-envelope waveform from products of carrier signals, code and data partition functions, and one or more subcarrier signals selected to optimize the signals of interest and suppress interference between signals.

CASM is applied to the modulation of coherently related quadrature duplexed military acquisition (MA) and military tracking (MT) signals onto quadrature phases of a subcarrier in constant envelope. CASM enables the modulation of new signals onto the quadrature multiplexed GPS C/A and P(Y) code signals. CASM pre-multiplies the subcarrier data and code modulation by the binary data and code partition functions, $\alpha_D$ and $\beta_C$ to enable the utilization of subcarrier intermodulation products that would otherwise be unusable signals. By so doing, the subcarrier modulation results in a highly efficient waveform, with two aspects of the same signal that may be optimized for military acquisition MA and military tracking MT signals. The CASM approach is based on the more general quadrature product subcarrier modulation (QPSM) applicable to the augmentation of an existing quadrature multiplexed communication system with new communication signals.

Figure 3:
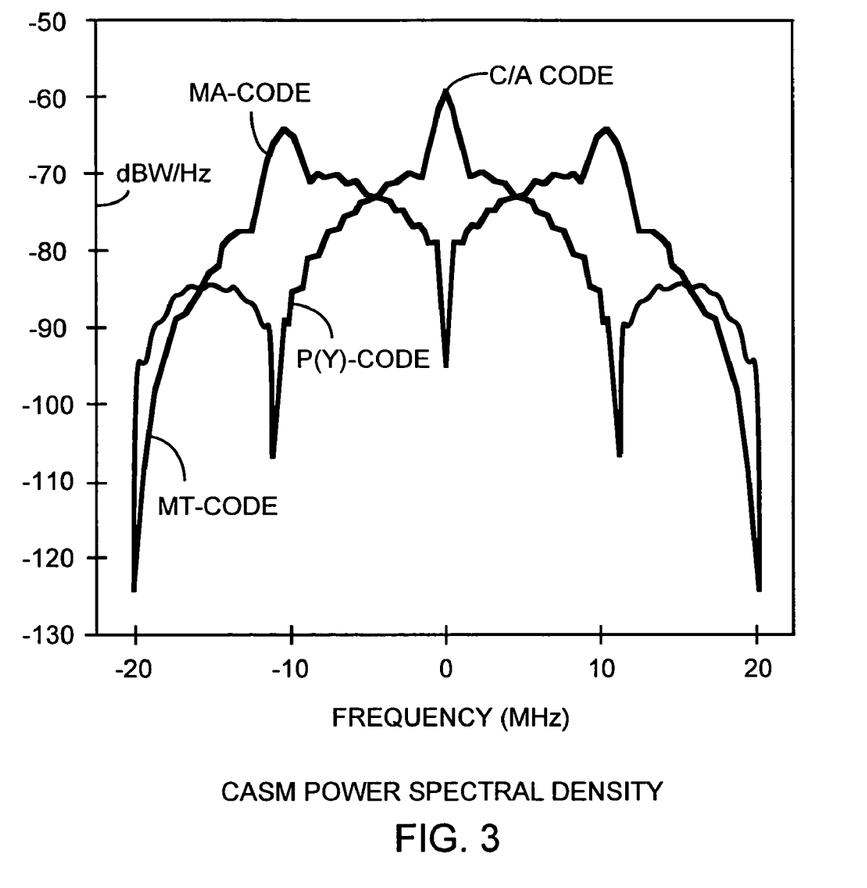
FIG. 3 is a CASM spectral plot.

In FIG. 3, the power spectral density of the a quadrature-multiplexed spread-spectrum transmitter is shown. The transmitter uses a modulation index m=1.16 rad for a QPSM waveform obtained for a complex-baseband implementation of the output of a QPSM transmitter. The carrier modulation curve can be thought of as a subset of the QPSM signals with m=0. The spectrum illustrates the spectral components of the QPSM waveform at +/− multiples of the 12.0 MHz subcarrier frequency. The position and magnitude of the QPSM harmonics reveal harmonic distribution and power content. In particular, the magnitude of the $J_2$ harmonic of the carrier for m=1.16 is less than 10.0 dB below that of the $J_0$ carrier components.

For the GPS CASM applications, $\alpha_D$ is equal to the GPS navigation data message and $\beta_C(t)$ is equal to C/A or P/Y. In the exemplar form, sinewave or square-wave subcarriers may be used. For a sinewave subcarrier, $\theta_S = \text{Sin}(\omega)_S t$. For square-wave subcarriers, one can generate Manchester encoded PRN code signals by setting $\theta_S(t) = \text{Sqr}(\omega_S t)$, with the frequency of the squarewave subcarrier signal set equal to the frequency of the PRN code signal.

Using the equations for $I_0(t)$ and $Q_0(t)$, the CASM phase-modulated GPS waveform is given by S(t) and represents the phase modulation of the current GPS waveform $S_0(t)$. CASM can be used to modulate a wide range of M-code signals, such as binary offset carrier variations, Manchester variations, or offset carrier variations. Also, the power ratio and code and data distribution for the I and/or Q channels, and nature of the M-code signal are easily controlled through the adjustment of m, $P_I$, $P_Q$, and the selection of the binary partition functions, $\alpha_D$ and $\beta_C$. CASM is preferably applied to existing GPS waveforms through the use of an analog phase modulator or through complex baseband subcarrier phase rotations. For subcarrier frequencies less than or equal to roughly 10.23 MHz, the complex baseband approach is a more flexible alternative, well within present day technology limits.

CASM may be implemented using a rapid prototyping capability to convert the transmitter design into a gate level design and downloaded to a single XYLINX 4085XL field programmable gate array with approximately 40K gates. A ten bit sine and cosine lookup table size leads to a subcarrier phase noise, due to quantization, of approximately −60 dBc. This level is adequate to maintain the current signal quality level of the current GPS signal. Unlike hard-limiting or Majority-vote combining, the CASM approach is applicable to the constant-envelope modulation of both squarewave and sinewave modulated ranging signals. For a square-wave subcarrier, the lookup tables can be implemented in non-real-time using $\text{Cos}(m\phi_S) = \text{Cos}(m)$ and $\text{Sin}(m\phi_S(t)) = \text{Sin}(m)$ $\phi_S(t)$ identities for a binary subcarrier modulation phase $\phi_S$. Only the constant values $\text{Cos}(m)$ and $\text{Sin}(m)$ need to be evaluated for the squarewave CASM.

CASM can be used with a single sinewave subcarrier as a constant envelope multiple mode spread spectrum subcarrier modulation for GPS. Considering only terms to order J2.

In general, there are an infinite number of carrier harmonics (J0, J2, J4, . . . ) and subcarrier harmonics (J1, J3, J5 . . . ) but only the first carrier and subcarrier harmonics need be considered for m≦π/2. For this range of the modulation index, the sinewave CASM approach is over 95% power efficient. For values of m greater than π/w, a much greater fraction of the transmitter power is lost to the n=2, 3, 4, 5 harmonics outside of the GPS band depending upon subcarrier selection. The current GPS waveform is recovered by setting m=0. The composite subcarrier PRN product codes and data messages can be expressed to a good approximation by only the dominant terms in the harmonic expansion by applying the sinewave subcarrier expression with the use of some well-known Bessel function identities. By the selection of $\alpha_D(t)$ and $\beta_D(t)$, $C_{IS}$ and $C_QS$ are coherently related to new military acquisition and tracking signals with the same M-code data modulation on both of these subcarrier signals. With the current partitioning of subcarrier code and data, the new MA acquisition and MT tracking codes are derived from the single new military PRN code $C_S(t)$. The P(Y)-code is a very long PRN code repeating each week. The randomness properties of the P(Y) code are used by military GPS receivers. By selecting the $C_S$ code to be a non-periodic tracking code, the correlation randomness properties of the MT code will be determined primarily by the properties of the $C_S$ code. The appropriate selection of the $C_S$ code relatively prime to the product of (C/A-code)* (P(Y)-Code) will result in a code with a length that is equal to the product of the lengths of the $C_S$ and the P(Y)-Codes, much longer than the current P(Y)-code. The generation of a long code from two relatively prime sequences is well known and is the primary basis for the current GPS P(Y)-code length. The M-code data modulation is determined by the current selection of data partition function, similar to the case of the PRN codes, by $D_M(t)=D_{IS}(t)=D_{QS}(t)=D_S(t)$ where $D_M(t)$ is defined as the new military navigation data message. The current selection of the data partition function leading to a single M-code data message, is convenient to adapt the CASM to the currently favored option of a single new M-code data modulation for the new military M-code signals but is not a limitation of the general approach. By setting $\beta_C(t)=C_P(t)$ instead of the C/A code, the I/Q phasing of the MA and MT codes are reversed. For this case, $C_{MA}=C_{IS}(t)=C_S(t)$ and $C_{MT}(t)=C_{QS}(t)=C_S(t)C_{C/A}(t)C_P(t)$. For this case, the partition of the data modulation remains unchanged and the MA and MT signals obtain power from alternate phases of the carrier, that is, the MA signal on the Q channel and MT signal on the I channel rather than the MA signal on I channel and the MT signal on the Q channel. The $C_S(t)$ is defined as $C_{MA}(t)$. A single new subcarrier acquisition code $C_S(t)$ is defined to generate both an acquisition and a tracking code signal. The designation acquisition and tracking does not mean that these signals cannot both be acquired and tracked, analogous to the case of C/A and P(Y) codes, but only that these signals are optimized for the these GPS operating states. The efficient use of this code with CASM utilizes this code as a useful ranging signal in a well controlled manner. The power contained in the MA and MT signals can be combined using a dual-code correlator to utilize the total power in the MA and MT signals.

Due to the ease of digital implementation, square-wave modulated ranging codes have become popular for use as a new M-code signal. The resulting higher harmonics of the carrier are not present in the square-wave CASM approach. Thus, to raise the subcarrier power well above the carrier power, M is increased to a value near π/2. For this case, the only losses are due to the band-limiting effects inherent in any square-wave modulated ranging signal. The current GPS waveform can be recovered for the case of m=0.

The sinewave and square-wave CASM approaches may be generalized to an arbitrary number of subcarriers into the generalized modulation subcarrier equation. This method may be useful to enable multiple military and, perhaps, additional civilian ranging signals to be transmitted in a single constant envelope waveform. The notation CASM (r,n) denotes the military acquisition (MA) and military tracking (MT) pair of signals generated by the CASM modulation method. The MA signal, MA (r,n), is formed from the product of a n×1.023 MCPS spreading code modulated by a r×1.023 MHz subcarrier and the MT signal, MT(r,n), is given by the MA signal modulated by C/A code and P(Y) code. In general, the MT code is given by the product of the MA code times an unencoded 10.23 MHz NRZ code. The MT-code signal will have a length greater than or equal to the current P(Y)-code signal, depending upon the selection of the MA code.

As an example of the CASM signals, a CASM(10,2) quadrature modulated pair of ranging signals consists of a MA(10,2) acquisition signal on the I phase of the carrier along with the P(Y) code and an MT(10,10) tracking signal on the Q phase along with the C/A Code that are modulated using the modulator depicted in FIG. 1 with $C_I$ equal to the P(Y) code, $C_Q$ equal to the C/A code and $C_S$ equal to a 2.046 MCPS NRZ formatted M-Code. In this example, the subcarrier signal is a 10.23 MHz squarewave, $D_I$ is equal to $D_Q$ that is also equal to the current GPS data navigation message and $D_S$ is the new military GPS subcarrier data message. The data partition function, α is equal to the current GPS navigation message and β is equal to the C/A code.

The power spectral densities (PSD) of this example are compared to the composite P(Y) code and C/A code spectrum depicted in FIG. 3 for the MA(10,2) and MT(10,10) signals respectively. With the exception of the P(Y)-code PSD, which was calculated analytically, the MA and MT code PSDs were determined from a simulation employing the exact C/A-codes and P(Y)-codes for PRN 1, and a 20'th order M-sequence for the MA Code. The PSD's were then obtained from a 1024 point Fast Fourier Transform followed by a discrete time autocorrelation using 512 Lags and a Hanning window function. The sampling rate of the simulation was $1.2276 \times 10^{08}$ samples per second. The MA signal for this option consists of a 2.046 MHz PRN code ($C_S(t)$) modulated by a 10.23 MHz squarewave subcarrier. The product of $C_S(t)C_P(t)C_{C/A}(t)$ results in an unbalanced 10.23 MHz PRN Code. The product of this code with a square-wave modulated ranging signal results in a 10.23 MHz Manchester code.

In general, it can be shown that the integer relation between the subcarrier frequency and the PRN code chip rate, as in the CASM(10,2) example, is not necessary for new M-code signals to have minimal interference with the C/A-code and P(Y)-code signals from a given satellite. Rather, it is only necessary that the frequency of the subcarrier, such as a sinewave or squarewave, is much greater than the GPS data rate. This is true for any subcarrier of frequency greater than 1.023 MHz.

The non-integer relationship has been simulated for the case of a CASM using a 5.115 MHz sinewave subcarrier modulating a 4.092 MHz PRN code ($C_S$). For this example, the simulated variance of the on-time C/A code correlated with the received Q-signal (C/A+MT) and on-time P(Y)-code correlated with the received I-signal (P+MA) was 4.14e−05 (with unit power in the PRN-codes). Relative to a signal level of −160 dBW, this value corresponds to a multiplexing noise density of only −203 dBW as compared to about −140 dB for thermal noise power out of a C/A-code correlator. This level is similar to the cross-correlation magnitude observed for the correlation of on-time C/A-code with a filtered 5.115 MHz Manchester code. This magnitude has been postulated to be identically zero if the bandwidth of the GPS system were infinite. This performance, together with CASM's inherent constant-envelope nature, make the approach a flexible, efficient modulation technique, capable of accommodating a wide range of signal modulation alternatives and providing the capability to control spectral isolation between signals inside and outside of the GPS band. Its flexibility minimizes the cost, complexity and risk associated with implementation of the GPS transmitter circuitry.

In the CASM waveform approach, both MA and MT code signals are generated from a single new ranging code. Each of these signals can be acquired and tracked independently of each other and independently of the C/A and P(Y) codes. Because the MA and MT ranging signals have low cross-correlation, as has been verified through simulation, and these signals are coherently related. The power of the MA and MT codes can be combined through the implementation of a non-coherent dual code correlator, not shown. The significant difference between the conventional correlator and the dual code correlator is that the sum of the MT and MA codes are used as local references rather than just the MA and MT codes alone. This straightforward implementation will result in the utilization of the total power contained in both the MA and MT signals during acquisition and tracking.

The CASM approach enables a highly efficient means to generate complementary military acquisition and tracking signals that are adaptable to both separate and combined-aperture implementations of the GPS modernization signals. In particular, the QPSM-based CASM modulator permits the constant envelope modulation of these new signals and existing GPS ranging signals to enable efficient transmission through a single high-power amplifier. Both sinewave and squarewave subcarrier implementations of CASM are straightforward complex-baseband implementation of a CASM modulator design. The general efficiency of the approach for both squarewave and sinewave subcarriers was demonstrated be in the range of 70% to 95% for practical subcarrier power ratios. Those skilled in the art can make enhancements, improvements and modifications to the invention, and these enhancements, improvements and modifications may nonetheless fall within the spirit and scope of the following claims.

What is claimed is:

1. A system for modulating DS data on an I phase communicating DI data and on a Q phase communicating DQ data, the I phase and Q phase are phases of a modulated carrier signal communicating the DI data and the DQ data and the DS data, the carrier signal has a total phase equal to arctangent of the Q phase divided by the I phase, the system comprising, an encoder for encoding the DI data and the DQ data respectively into an Io encoded signal and a Qo encoded signal, an encoded subcarrier modulation signal generator for receiving one or more of the DS data and the DI data and the DQ data and for generating an encoded subcarrier modulation signal, the encoded subcarrier modulation signal comprises a product of a data partition function and the DS data, the data partition function is a function of one or more of the DI data and the DQ data and the DS data, a modulator for modulating a subcarrier signal by the encoded subcarrier modulation signal for providing a modulated subcarrier signal, for modulating the total phase of the carrier signal by the modulated subcarrier signal, for modulating the I phase of the carrier signal by the Io encoded signal and by an I phase subcarrier signal to provide an I phase carrier signal and for modulating the Q phase of the carrier signal by the Qo encoded signal and by a Q phase subcarrier signal to provide a Q phase carrier signal, the modulator combining the Q phase carrier signal and the I phase carrier signal as a composite signal, the I phase subcarrier signal is an I intermodulation product of the encoded subcarrier modulation signal and the Qo encoded signal, the Q phase subcarrier signal is a Q intermodulation product of the encoded subcarrier modulation signal and the Io encoded signal, the ratio of the Q intermodulation product over the I intermodulation product is equal to the ratio of the Io encoded signal over the Qo encoded signal, the composite signal has a constant amplitude envelop.

2. The system of claim 1, wherein the encoder comprises:

a Q encoder for encoding the DQ data into the Qo encoded signal; and an I encoder for encoding the DI data into the Io encoded signal, the encoded subcarrier modulation signal generator comprises:

a data partition function generator for receiving one or more of the DI data and the DQ data and the DS data and for generating a data partition signal;

a modulo two mixer for mixing the data partition signal with the DS data into a modified DS data signal; and a data encoder encoding the modified DS data signal into the encoded subcarrier modulation signal, the modulator comprises:

a subcarrier generator for generating the subcarrier signal;

a multiplier for multiplying the subcarrier signal by a modulation index for generating a scaled subcarrier signal;

a scaling mixer for mixing the scaled subcarrier signal with the encoded subcarrier modulation signal for providing the modulated subcarrier signal;

a sine and cosine subcarrier processor for receiving the modulated subcarrier signal for generating a sine subcarrier signal and a cosine subcarrier signal, the sine subcarrier signal is modulated by the DS data, the cosine subcarrier signal is unmodulated by the DS data;

a carrier phase rotator for combining the sine subcarrier signal and the cosine subcarrier signal with both of Io encoded signal and the Qo encoded signal and for providing I and Q rotated signals, the I rotated signal comprises a scaled Io encoded signal for communicating the DI data and comprises a scaled I phase subcarrier signal for communicating the DS data, the Q rotated signal comprises a scaled Qo encoded signal for communicating the DQ data and a scaled Q phase subcarrier signal for communicating the DS data, the scaled I phase and Q phase subcarrier signals are the I and Q intermodulation products and are generated when the sine and cosine subcarrier signals are rotated and combined with Io encoded signal to form the I rotated signal and when the sine and cosine subcarrier signals are rotated and combined with the Qo encoded signal to form the Q rotated signal, the scaled I phase and scaled Q phase subcarrier signals are orthogonal and are the I and Q intermodulation products of the Io and Qo encoded signals modulated by harmonics of the modulated subcarrier signal, the I and Q rotated signals are scaled by harmonics of the scaled subcarrier signal; and, a quadrature modulator for receiving the I and Q rotated signals and the carrier signal for respective I and Q phase modulation of the carrier signal by the I and Q rotated signals to provide the composite signal having the I phase and Q phase, the DI data is communicated on the I phase of the composite signal, the DQ data is communicated on the Q phase of the composite signal, and the DS data is communicated on both of the I phase and Q phase of the composite signal, the constant amplitude envelope results from the I and Q phase modulation of the carrier signal by the modulated subcarrier signal.

3. The system of claim 2, wherein the modulation index is less than or equal to π/2 radians.

4. The system of claim 1 wherein
the encoder comprises:
a Q encoder for encoding the Q data into the Qo encoded signal; and
an I encoder for encoding the I data into the Io encoded signal,
the encoded subcarrier modulation signal generator comprises:
a data partition function generator for receiving one or more of the DI data and the DQ data and the DS data for generating a data partition signal;
a modulo two mixer for mixing the data partition signal with the DS data into a modified DS data signal; and
a data encoder encoding the modified DS data signal into the encoded subcarrier modulation signal,
the modulator comprises:
a subcarrier generator for generating the subcarrier signal;
a subcarrier modulator for modulating the encoded subcarrier modulation signal onto the subcarrier signal to provide the modulated subcarrier signal;
a quadrature modulator for modulating Io encoded signal and Qo encoded signal onto an IF signal for providing a quadrature IF signal;
a phase modulator having a modulation index for phase modulating an RF signal by the modulated subcarrier signal to provide a modulated subcarrier RF signal; and
a mixer for mixing the quadrature IF signal with the modulated subcarrier RF signal to provide the composite signal comprising the carrier signal that is a product of the IF signal and the RF signal.

5. The system of claim 4, wherein the subcarrier signal is a sinewave signal.

6. The system of claim 1, wherein,
the encoder is further for setting an I phase to Q phase power ratio of power of the Io encoded signal relative to power of the Qo encoded signal, and for further setting the same I phase to Q phase power ratio of power of the Q phase subcarrier signal relative to power of the I phase subcarrier signal, and the modulator is de fined by a modulation index for setting a carrier to subcarrier power ratio between the power of Io and Qo encoded signals relative to the I phase and Q phase subcarrier signals.

7. The system of claim 1, wherein the subcarrier signal is a periodic signal.

8. A system for modulating DS data on an I phase communicating DI data and on a Q phase communicating DQ data, the I phase and Q phase are phases of a modulated carrier signal communicating the DI data and DQ data, the carrier signal has a total phase equal to arctangent of the Q phase divided by the I phase, the DI data is communicated in spread spectrum signals spread by an CI code, the DQ data is communicated in spread spectrum signals spread by an CQ code, the DS data is communicated in spread spectrum signals spread by an CS code, the DS data is subcarrier data and CS code is a subcarrier code, the system comprising, an encoder for encoding the DI data spread by the CI code into an Io encoded signal, and for encoding the DQ data spread by the CQ code into a Qo encoded signal, an encoded subcarrier modulation signal generator for receiving the DS data and the CS code and the DI data and the CI code and the DQ data and the CQ code and for generating an encoded subcarrier modulation signal, the encoded subcarrier modulation signal comprises a product of a data partition function and a code partition function and the DS data and the CS code, the data partition function is a function of one or more of the DI data and the QI data and the DS data, the code partition function is a function of one or more of the CI code and the CQ code and the CS code, and a modulator for modulating a subcarrier signal by the encoded subcarrier modulation signal for providing a modulated subcarrier signal, for modulating the total phase of the carrier signal by the modulated subcarrier signal, for modulating the I phase of the carrier signal by the Io encoded signal and by an I phase subcarrier signal to provide an I phase carrier signal and for modulating the Q phase of the carrier signal by the Qo encoded signal and by an Q phase subcarrier signal to provide a Q phase carrier signal, the carrier modulator combining the Q phase carrier signal and the I phase carrier signal as a composite signal, the Q phase subcarrier signal is a Q intermodulation product of the encoded subcarrier modulation signal and the Io encoded signal, the I phase subcarrier signal is an I intermodulation product of the encoded subcarrier modulation signal and the Qo encoded signal, the ratio of the Q intermodulation product over the I intermodulation product is equal to the ratio of the Io encoded signal over the Qo encoded signal, the composite signal has a constant amplitude envelop.

9. The system of claim 8, wherein,
the data partition function is an alpha function, the alpha function has a square identity, the alpha function is selected from a group consisting of a first alpha function equaling DI that equals DQ, a second alpha function equaling DS when DI equal to DQ, a third alpha function equaling DS when DI does not equal DQ, a fourth alpha function equaling one when DI does not equal DQ, and a fifth alpha function equaling one when DI equals DQ, and the code partition function is a beta function, the beta function has a square identity, the beta function is selected from a group consisting of a first beta function equaling one, a second beta function equaling CI times CQ, a third beta function equaling CI, a fourth beta function equaling CQ, and a fifth beta function equaling CS.

10. The system of claim 8, wherein the encoder is further for setting a power ratio of the Io encoded signal relative to Qo encoded signals, and for setting the same power ratio of the Q phase subcarrier signal relative to the I phase subcarrier signal.

11. The system of claim 8, wherein the modulator is defined by a modulation index for setting a power ratio between power of Io and Qo encoded signals relative to power of the Q phase and I phase subcarrier signals.

12. The system of claim 11, wherein power of the Q phase and I phase subcarrier signals is less than power of the Io and Qo encoded signals modulated on the carrier signal.

13. The system of claim 8, wherein the modulator comprises,
a subcarrier generator for generating the subcarrier signal;
a subcarrier modulator for modulating the encoded subcarrier modulation signal onto the subcarrier signal to provide a modulated subcarrier signal;
a quadrature modulator for modulating Io encoded signal and Qo encoded signal onto an IF signal for providing a quadrature IF signal;
a phase modulator having a modulation index for phase modulating an RF signal by the modulated subcarrier signal to provide a modulated subcarrier RF signal; and
a mixer for mixing the quadrature IF signal with the modulated subcarrier RF signal to provide the composite signal comprising the carrier signal that is a product of the IF signal and the RF signal.

14. The system of claim 8, wherein the encoder comprises,
a Q mixer for spreading the DQ data by the CQ code to provide a DCQ spread spectrum signal,
a Q encoder for encoding the DCQ spread spectrum signal into the Qo encoded signal,
a Q amplifier for setting a Q power level of the Qo encoded signal,
an I mixer for spreading the DI data by the CI code to provide a DCI spread spectrum signal,
an I encoder for encoding the DCI spread spectrum signal into the Io encoded signal, and
an I amplifier for setting an I power level of the Io encoded signal.

15. The system of claim 14, wherein the I power level does not equal the Q power level.

16. The system of claim 8, wherein the encoded subcarrier modulation signal generator comprises,
a data partition function generator for receiving one or more of the DS data and the DI data and the DQ data and for generating a data partition signal,
a code partition function generator for receiving one or more of the CS code and the CI code and the QI code and for generating a code partition signal,
a data mixer for modulo two mixing the DS data and the data partition signal into a modulo two data signal,
a code mixer for modulo two mixing the CS code and the code partition signal into a modulo two code signal,
a modulo two mixer for modulo two mixing the modulo two data signal with the modulo two code signal for providing a modified subcarrier data signal, and
a data encoder for encoding the modified subcarrier data signal into the encoded subcarrier modulation signal.

17. The system of claim 8, wherein the modulator comprises,
a subcarrier generator for generating the subcarrier signal;
a multiplier for multiplying the subcarrier signal by a modulation index for generating a scaled subcarrier signal;
a scaling mixer for mixing the scaled subcarrier signal with the encoded subcarrier modulation signal for providing a modulated subcarrier signal;
a sine and cosine subcarrier processor for receiving the modulated subcarrier signal for generating a sine subcarrier signal and a cosine subcarrier signal, the sine subcarrier signal is modulated by the DS data, the cosine subcarrier signal is unmodulated by the DS data;
a carrier phase rotator for combining the sine subcarrier signal and the cosine subcarrier signal with both of Io encoded signal and the Qo encoded signal and for providing I and Q rotated signals, the I rotated signal comprises a scaled Io encoded signal for communicating the DI data and comprises a scaled I phase subcarrier signal for communicating the DS data, the Q rotated signal comprises a scaled Qo encoded signal for communicating the DQ data and a scaled Q phase subcarrier signal for communicating the DS data, the scaled I phase and Q phase subcarrier signals are the I and Q intermodulation products and are generated when the sine and cosine subcarrier signals are rotated and combined with Io encoded signal to form the I rotated signal and when the sine and cosine subcarrier signals are rotated and combined with the Qo encoded signal to form the Q rotated signal, the scaled I phase and scaled Q phase subcarrier signals are orthogonal and are the I and Q intermodulation products of the Io and Qo encoded signals modulated by harmonics of the modulated subcarrier signal, the I and Q rotated signals are scaled by harmonics of the scaled subcarrier signal; and
a quadrature modulator for receiving the I and Q rotated signals and the carrier signal for respective I and Q phase modulation of the carrier signal by the I and Q rotated signals to provide the composite signal having the I phase and Q phase, the DI data is communicated on the I phase of the composite signal, the DQ data is communicated on the Q phase of the composite signal, and the DS data is communicated on both of the I phase and Q phase of the composite signal, the constant amplitude envelope results from the I and Q phase modulation of the carrier signal by the modulated subcarrier signal.

18. The system of the claim 17, wherein the subcarrier signal is a squarewave.

19. The system of claim 8, wherein the modulator comprises,
a subcarrier generator for generating the subcarrier signal;
a multiplier for multiplying the subcarrier signal by a modulation index for generating a scaled subcarrier signal;
a scaling mixer for mixing the scaled subcarrier signal with the encoded subcarrier modulation signal for providing a modulated subcarrier signal;
a sine and cosine subcarrier processor for receiving the modulated subcarrier signal for generating a sine subcarrier signal and a cosine subcarrier signal, the sine subcarrier signal is modulated by the DS data, the cosine subcarrier signal is unmodulated by the DS data;
a carrier phase rotator for combining the sine subcarrier signal and the cosine subcarrier signal with both of Io encoded signal and the Qo encoded signal and for providing I and Q rotated signals, the I rotated signal comprises a scaled Io encoded signal for communicating the DI data and comprises a scaled I phase subcarrier signal for communicating the DS data, the Q rotated signal comprises a scaled Qo encoded signal for communicating the DQ data and a scaled Q phase subcarrier signal for communicating the DS data, the scaled I phase and Q phase subcarrier signals are the I and Q intermodulation products and are generated when the sine and cosine subcarrier signals are rotated and combined with Io encoded signal to form the I rotated signal and when the sine and cosine subcarrier signals are rotated and combined with the Qo encoded signal to form the Q rotated signal, the scaled I phase and scaled Q phase subcarrier signals are orthogonal and are the I and Q intermodulation products of the Io and Qo encoded signals modulated by harmonics of the modulated subcarrier signal, the I and Q rotated signals are scaled by harmonics of the scaled subcarrier signal, the sine subcarrier signal comprises modulation index scaled, subcarrier data modulated, odd subcarrier harmonic signals, the cosine subcarrier signal comprises modulation index scaled even subcarrier harmonic signals, the modulation index is set to a predetermined value to weight subcarrier harmonics to set power of the carrier signal relative to the subcarrier signal while maintaining the constant envelop of the composite signal; and a quadrature modulator for receiving the I and Q rotated signals and the carrier signal for respective I and Q phase modulation of the carrier signal by the I and Q rotated signals to provide the composite signal having the I phase and Q phase, the DI data is communicated on the I phase of the composite signal, the DQ data is communicated on the Q phase of the composite signal, and the DS data is communicated on both of the I phase and Q phase of the composite signal, the constant amplitude envelope results from the I and Q phase modulation of the carrier signal by the modulated subcarrier signal.

20. The system of claim 19, wherein the modulated subcarrier signal is equal to the modulation index multiplied by the DS data by the data partition function by the code partition function by CS code and by the subcarrier signal.

* * * * *